(Specimens.)
H. K. JONES.
PROCESS OF TREATING METALS.
No. 427,768. Patented May 13, 1890.
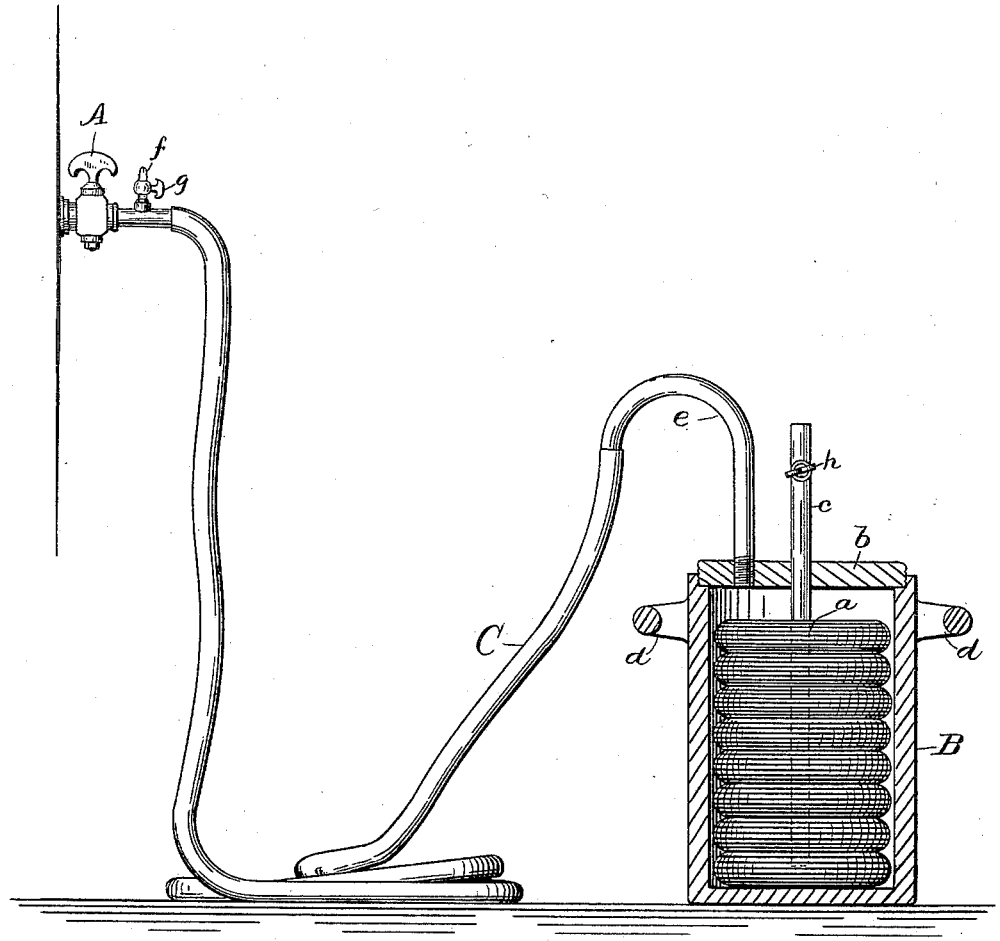
Witnesses.
John Edwards Jr.
W. H. Whiting
Inventor.
Horace K. Jones.
By James Shepard
Atty.

UNITED STATES PATENT OFFICE.

HORACE K. JONES, OF HARTFORD, CONNECTICUT.

PROCESS OF TREATING METALS.

SPECIFICATION forming part of Letters Patent No. 427,768, dated May 13, 1890.

Application filed June 20, 1888. Serial No. 277,633. (Specimens.)

*To all whom it may concern:*

Be it known that I, HORACE K. JONES, a citizen of the United States, residing at Hartford, in the county of Hartford and State of Connecticut, have invented certain new and useful Improvements in the Process of Annealing Metal, of which the following is a specification.

My invention relates to the method of annealing metals, and the chief object of my invention is economy in gas and fuel.

It is well known that if iron when being annealed is subjected to ordinary illuminating-gas or equivalent gases oxidation is prevented. This knowledge is, however, theoretical—that is to say, it is confined to descriptions in patents and other publications, instead of being in practical use. I have, however, used my process quite extensively for a considerable time and am still using it. So far as I know I am the only one who has ever made successful and continued practical use of the same as a regular thing in due course of business. In all of the processes of annealing heretofore known to me the metal has been heated in chambers which were sealed as tightly as possible, or else a continual flow of gas has been passed through the vessel. The first method is objectionable, for the reason that it requires a very strong vessel to prevent explosion, and, second, that even with the greatest care some leakage is likely to occur, and therefore when the gas shrinks in cooling air is admitted, which causes oxidation. The second method is objectionable, especially in localities where gas is expensive, on account of the waste of gas caused by the continuous flow. From this state of the art it will be seen that the chemical process of the action of gas on iron in annealing is old and that my invention is in the nature of a mechanical process—that is, in the succession of mechanical steps in the treatment of iron in the practice of this old process.

In the accompanying drawing I have illustrated by a single figure, partly in vertical section and partly in elevation, an apparatus which may be used in the practice of my invention.

My process is particularly applicable to annealing wrought-iron, homogeneous iron, or steel of the kind and composition ordinarily in the market; but I do not wish in any way to limit myself to any specific metal.

A designates a gas-cock, which is attached to a pipe leading from the main source of supply—as, for instance, the city gas-works or other suitable reservoir that will maintain practically a uniform pressure during the heating and cooling processes.

B is a chamber or vessel, which is illustrated as filled with coils of wire $a$ and closed by a cover $b$, so as to make it practically gas-tight.

$c$ designates a passage or pipe which extends through the cover to near the bottom of the vessel and is closed by the cock $h$, and $d\ d$ designate handles for convenience in lifting the vessel.

$e$ designates a section of pipe which opens into the vessel B at one end, and at its other end there is a flexible connecting-pipe C, which connects the pipe $e$ with the reservoir. I also provide a small gas-burner $f$, having a cock $g$, and preferably locate the same near the cock A.

I prefer to employ a portable vessel, so that it may be filled with the metals to be treated and closed or sealed before the vessel is placed in the heating-furnace. The vent-port is opened—as, for instance, by opening the stop-cock $h$ in the pipe $c$—and gas is admitted to the vessel B through the stop-cock A. The gas is allowed to flow until the air is wholly expelled from the vessel B through the vent. Whether or not the air is so expelled can be tested by applying fire to the vent and noticing whether or not the gas burns steadily. When all the air is expelled, the stop-cock $h$ is closed to seal the vessel as tightly as possible, the vessel being still connected with the gas-reservoir and under the pressure of the gas therein, in which condition it is placed within a suitable heating-furnace and brought up to a red heat. As the gas expands in heating, the excess in volume is pressed back into the reservoir, but the gas within the vessel is maintained under the same pressure as that in the reservoir, so as to insure keeping the vessel filled with gas under practically a uniform pressure. After the desired heat has been imparted to the metal within the vessel for a sufficient length of time, as in ordinary annealing, said vessel is removed from the furnace by means of any hoisting apparatus and is allowed to cool. Other vessels may have been filled for replenishing the furnace as soon as the first vessel or vessels is or are removed, so that there may be no waste of fuel or time. When the removed vessels are cooling and the gas therein shrinks, the shrinkage is followed up by the pressure in the reservoir, thereby keeping the vessel B filled with gas during the entire operation until the metal is thoroughly cooled, whereby all oxidation is prevented and without an unnecessary waste of gas. There may at times be some slight leakage of the vessel; but this will do no harm, with the exception of waste, as the gas will be immediately burned when it escapes. Such escape of gas is, however, not intentional, as I design in all cases to make all parts of the vessel and its connections as tight as is practicable.

The advantages of utilizing the pressure in the gas-main or gas-reservoir to provide for expansion and contraction of the gas within the vessel B may be attained by the use of a vessel permanently located within the furnace and connected with the reservoir either by a flexible or rigid connection; but such an arrangement does not accomplish the economy in time and fuel that is accomplished with the use of a portable vessel.

So much of the process or method as I have herein described is complete in itself for a useful purpose; but a still further saving of gas may be effected by adding another step to the sub-process thus described.

In cases where there is considerable space for gas within the vessel—as, for instance, when the work or articles placed within the chamber do not fill the vessel—I make a saving in gas by forcing the gas that remains in the vessel after cooling back into the reservoir. This may be done by attaching to the pipe $c$ a pipe for the introduction of compressed air, either under the action of a pump or other suitable means, and thereby force the gas which thus remains in the vessel and pipes back through the pipes $e$ C and through the stop-cock A into the reservoir. In order to determine when the gas is thus forced back, I provide the small burner $f$, the cock leading to which may be opened about the time the gas is expected to be thus forced out. By applying a light to the burner and watching the color of the flame one can readily detect the pressure of air in the flame, which shows that the gas is nearly all forced out of the pipe C and that it is time to close the cock A and discontinue the admission of compressed air. The vessel can then be opened for reloading without any material waste of gas. After a few trials with a given vessel filled with a given article the approximate time required for forcing the gas from the vessel, and consequently the time to light the burner $f$, can easily be determined. If the burner is a small one, there would be but little waste of gas if it was lighted long before all gas was expelled.

I claim as my invention—

1. The method of annealing metals, which consists in heating the metal and allowing it to cool under pressure of a non-oxidizing gas, which pressure is maintained during the cooling and heating operation within the closed annealing-chamber by an open connection with the gas-supply, allowing free movement of said gas to and from the gas-supply, substantially as described, and for the purpose specified.

2. The method of annealing metals, which consists in placing the metal in a suitable vessel, expelling the air therefrom by the introduction of gas, then closing the vent and placing the vessel and its contents in a furnace, where it is subjected to heat, then removing the vessel with its contents from the furnace to cool, and maintaining throughout the heating and cooling a constant pressure of gas within the vessel, substantially as described, and for the purpose specified.

HORACE K. JONES.

Witnesses:
P. M. BRONSON,
JAMES SHEPARD.